Patented May 7, 1940

2,200,005

UNITED STATES PATENT OFFICE 2,200,005

AZO DYE COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application December 8, 1938, Serial No. 244,638

9 Claims. (Cl. 260—205)

This invention relates to the art of dyeing or coloring. More particularly, it relates to new aromatic azo dye compounds and the application of the nuclear non-sulfonated dye compounds for the coloration of organic derivatives of cellulose, particularly textile materials made of or containing an organic derivative of cellulose, by dyeing, printing, stenciling, or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of aromatic azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention have the probable general formula:

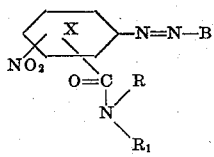

wherein B represents the residue of an aromatic group, a hydroaromatic group or a heterocyclic group, said residue being joined to the azo bond directly through its nucleus, or an arylketoacidylamino residue joined to the azo bond through the ketoacidylamino group, R and $R_1$ each represents hydrogen, an alkyl group, an allyl group, an aryl group, a hydroaromatic group or a heterocyclic group and wherein

together may be morpholine and X means that the benzene nucleus is further substituted with a substituent such as a nitro group, a halogen atom, an alkyl group, an alkoxy group, a

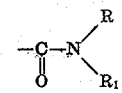

or a

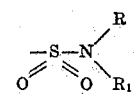

group, wherein R and $R_1$ have the meaning previously assigned to them.

It will be understood that alkyl, as used herein, unless otherwise stated, includes not only unsubstituted alkyl groups such as a methyl group, an ethyl group or a propyl group but also substituted alkyl groups such as β-hydroxyethyl, β,γ-hydroxypropyl, β-methoxyethyl or β-ethoxyethyl, for example. Illustrative of halogen may be mentioned chlorine, bromine and iodine. Similarly, illustrative alkoxy groups include methoxy, ethoxy and propoxy. Illustrative ketoacidyl groups include

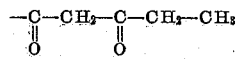

and

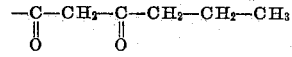

The azo dye compounds of our invention can be prepared by diazotizing an amine having the general formula:

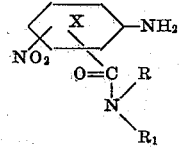

wherein R, $R_1$ and X have the meaning previously assigned to them and coupling the diazonium compound obtained with an aromatic, hydroaromatic or heterocyclic coupling compound or with an arylketoacidylamino coupling compound.

Advantageously, B is a benzene nucleus containing a

group wherein $R_2$ and $R_3$ each represents hydrogen, an alkyl group, an aryl group, a cycloalkyl group, or a benzyl radical. Non-sulfonated compounds wherein the coupling component is as just described are generally advantageous for the dyeing of organic derivatives of cellulose.

As previously indicated, the nuclear non-sulfonated aromatic azo dye compounds of our invention constitute valuable dyes for the coloration of organic derivatives of cellulose such as those hereinbefore mentioned, yielding various shades thereon of good fastness to light and washing. These nuclear non-sulfonated dye compounds likewise possess application for the dyeing of wool and silk and yield generally similar shades on these materials as on organic derivatives of cellulose. The azo dye compounds of our invention can be sulfonated to obtain nuclear sulfonated compounds. These compounds possess little or no utility for the coloration of organic derivatives of cellulose but can be employed to color textile materials such as wool and silk.

The following examples illustrate the preparation of the azo dye compounds of our invention:

Example 1

(A) 7 grams of sodium nitrite are dissolved in 53 cc. sulfuric (sp. gr. 1.84) acid at 10–15° C., warmed to 70° C. and then cooled to 10–15° C.

(B) 26 grams of 3-nitro-5-bromo-6-amino benzamide are dissolved in 220 cc. hot acetic acid and then cooled rapidly to room temperature.

While stirring (A), add (B) over a period of 30 minutes, maintaining a temperature of 10–15° C. and then stir at room temperature for several hours. Then 1 gm. of urea is added.

10.8 grams of p-cresol are dissolved in water containing an excess of sodium carbonate. A large volume of ice is added and the diazo solution is added slowly with stirring. When coupling is complete, the mixture is made acid to litmus with acetic acid and the dye is filtered, washed and dried.

Example 2

24.3 grams of 3-nitro-5-chloro-6-amino dimethylbenzamide are diazotized as described in Example 1.

21.1 grams of o-chloroacetoacetanilide are dissolved in cold acetic acid and the diazo solution is added with stirring. After standing a short time the mixture is made neutral to Congo red paper with sodium acetate and when coupling is complete the dye is precipitated by adding water, filtered, washed and dried.

Example 3

18.1 grams of di-β-hydroxyethylaniline are dissolved in cold dilute hydrochloric acid and the diazo solution of Example 1 is added with stirring. Coupling is completed by adding sodium acetate. The dye is filtered, washed and dried.

Example 4

22.5 grams of di-β-hydroxyethylcresidine are dissolved in cold dilute hydrochloric acid and the diazo solution of Example 2 is added. Coupling and recovery of the dye compound formed is carried out as previously described.

Example 5

22.6 grams of 3,5-dinitro-6-aminobenzamide are diazotized as described in Example 1.

22.6 grams of 1-amino-5-naphthol are dissolved in cold dilute hydrochloric acid, ice is added and the diazo solution is run in with stirring. The mixture is then treated with sodium acetate until Congo is no longer colored. The dye is filtered, washed and dried. In place of the above coupling component we may use 1-β-hydroxyethylamino-5-naphthol, 1-γ-hydroxypropylamino-5-naphthol, 1-tetrahydrofurfuryl-amino-5-naphthol, 1-glyceryl-amino-5-naphthol, 1-ethylamino-5-naphthol, and 1-dimethylamino-5-naphthol, for example.

Example 6

0.1 gram mole of sodium 2,5-dimethoxysulfatoethylbutylaniline are dissolved in water. Ice is added and the diazo solution of Example 5 is added with stirring. Concurrently with the addition of the diazo solution there is added a solution of sodium carbonate at such a rate that the mixture is slightly acid to Congo. When coupling is complete the dye is salted out, filtered, and dried.

Example 7

29.2 grams of 3,5-dinitro-6-aminodiethylbenzamide are diazotized as described in Example 1.

24.7 grams of β'-hydroxy-β-ethoxyethylamino-5-hydroxy-6,8-dibromonaphthalene are dissolved in hydrochloric acid and coupling is carried out as previously described. In place of the above coupling component we may use 1-sodium-β-sulfoethylamino-5-naphthol and β-hydroxy-γ-methoxy propyl-α-naphthylamine, for example.

Example 8

29.2 grams of

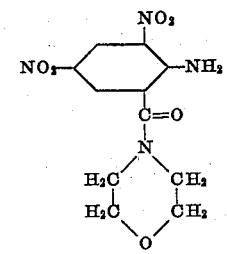

are diazotized as described in Example 1.

19.9 grams of

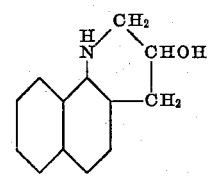

are dissolved in cold dilute sulfuric acid and coupling is carried out as previously described. In place of the above coupling compound we may use

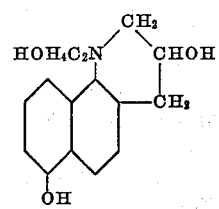

and

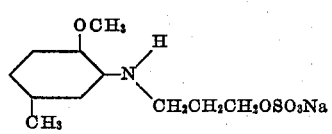

therefor for example.

Example 9

21.1 grams of glyceryl cresidine are dissolved in cold dilute hydrochloric acid and coupled with the diazo compound of Example 7. The dye compound formed is filtered, washed with water and dried.

*Example 10*

28 grams of

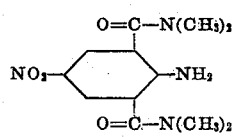

are diazotized as described in Example 1.

16.5 grams of ethyl-β-hydroxyethylaniline are dissolved in cold dilute hydrochloric acid and coupling is carried out as previously described.

*Example 11*

0.1 gram mole of ethyl-β-hydroxyethyl-m-toluidine are dissolved in cold dilute hydrochloric acid and coupled with the diazo solution of Example 10 as previously described.

*Example 12*

30.2 grams of

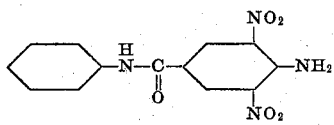

are diazotized as described in Example 1.

acid and coupling is carried out as previously described.

*Example 13*

36.1 grams of

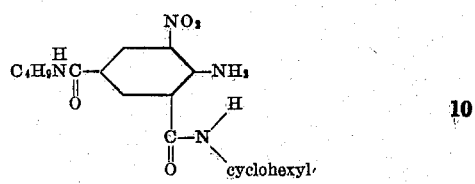

are diazotized as described in Example 1.

0.1 gram mole of di-β-hydroxyethyl-m-chloroaniline are dissolved in dilute hydrochloric acid and coupling and recovery of the dye compound formed is carried out as previously described.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reaction may, for example, be carried out following the general procedure described in Examples 1 to 13, inclusive.

| Amine | Coupling component | Color on cellulose acetate silk |
|---|---|---|
| (1) 3-nitro-5-bromo-6-aminobenzamide | Barbituric acid | Yellow. |
| (2) 3-nitro-5-chloro-6-aminoethylbenzamide | do | Do. |
| (3) 3-nitro-5-chloro-6-aminodiethylbenzamide | do | Do. |
| Amines 1-3 above | o-Chloroacetoacetanilide | Do. |
| Do | Dimethylaniline | Rubine. |
| Do | Di-β-hydroxyethylaniline | Do. |
| Do | Di-β-hydroxeythyl-m-toluidine | Wine. |
| Do | Di-β-hydroxyethyl cresidine | Violet. |
| Do | 1-amino-5-naphthol | Blue. |
| Do | 1-β-hydroxyethylamino-5-naphthol | Greenish-blue. |
| Do | 1-glycerylamino-5-naphthol | Do. |
| (4) 3,5-dinitro-6-aminobenzamide | 5,5-dimethyl-1,3-cyclohexadione | Yellow. |
| (5) 3,5-dinitro-6-aminoethylbenzamide | 5,5-dimethyl-1,3-cyclohexadione | Do. |
| (6) 3,5-dinitro-6-aminodimethylbenzamide | 5,5-dimethyl-1,3-cyclohexadione | Do. |
| (7) 3,5-dinitro-6-aminoethylsulfoethylbenzamide | 5,5-dimethyl-1,3-cyclohexadione | Do. |
| Amines 4-7 above | Ethyl-β-hydroxyethylaniline | Wine. |
| Do | Cetyl-2,5-dimethoxyaniline | Blue. |
| Do | Ethylglycerylcresidine | Do. |
| Do | Ethylsulfatoethyl-m-toluidine | Violet. |
| Do | Butyl-sulfoethyl-m-anisidine | Do. |
| Do | 1-amino-5-naphthol | Blue. |
| Do | 1-β-hydroxyethylamino-5-naphthol | Blue-green. |
| Do | 1-glycerylamino-5-naphthol | Do. |
| Do | 1-β-hydroxy-β-ethoxyethylamino-5-naphthol | Do. |
| Do | 1-sodium-β-sulfatopropylamino-5-naphthol | Do. |
| Do | Glycerylamino-α-naphthylamine | Blue. |
| [structure of 4-nitro-2,5-bis(N,N-dimethylcarbamoyl)aniline] | Ethylglycerylaniline | Wine. |
| Do | Ethylglycerylcresidine | Purple. |
| Do | Ethylglyceryl-2,5-dialkoxyaniline | Reddish-blue. |
| Do | 1-tetrahydrofurfurylamino-5-naphthol | Blue-green. |
| [structure of morpholinocarbonyl-dinitroaniline] | Butyl-glycerylaniline | Wine. |
| Do | Butyl-β-hydroxyethyl-m-toluidine | Do. |
| Do | 1-γ-hydroxypropylamino-5-naphthol | Blue. |

22.3 grams of m-β-hydroxyethoxymethylbutylaniline are dissolved in cold dilute hydrochloric The azo dye compounds of our invention are, for the most part, relatively insoluble in water.

Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds having the general formula:

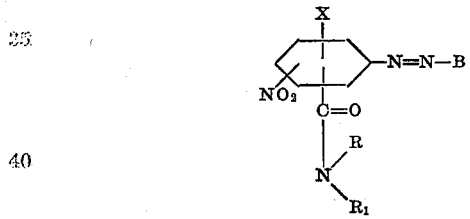

wherein B represents the residue of a member selected from the group consisting of an aryl nucleus of the benzene series containing but one benzene ring, an aryl nucleus of the naphthalene series, a heterocyclic nucleus, a 1,3-cyclohexadione nucleus, said benzene, naphthalene, heterocyclic and cyclohexadione nuclei being joined to the azo bond through their nuclei, and an aryl ketoacidylamino residue joined to the azo bond through the ketoacidylamino group, R and R₁ each represents a member selected from the group consisting of hydrogen, an alkyl group, an allyl group, a phenyl nucleus and a cyclohexyl group, X represents a member selected from the group consisting of a nitro group, a halogen atom, an alkyl group, an alkoxy group, a

group and a

group, wherein R and R₁ have the meaning above given, and

may be morpholine.

2. The azo dye compounds having the general formula:

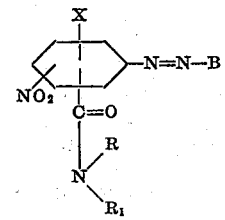

wherein B represents the residue of an aryl coupling component of the benzene series containing but one benzene nucleus, R and R₁ each represents a member selected from the group consisting of hydrogen, an alkyl group, an allyl group, a phenyl nucleus and a cyclohexyl group, X represents a member selected from the group consisting of a nitro group, a halogen atom, an alkyl group, an alkoxy group, a

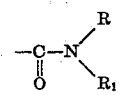

group and a

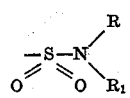

group, wherein R and R₁ have the meaning above given, and

may be morpholine.

3. The azo dye compounds having the general formula:

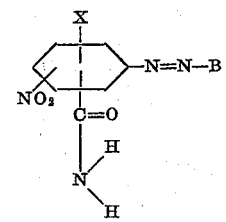

wherein B represents the residue of an aryl coupling component of the benzene series containing but one benzene nucleus, X represents a member selected from the group consisting of a nitro group, a halogen atom, an alkyl group, an alkoxy group, a

group and a

group, and wherein each of the hydrogen atoms attached to the nitrogen atom of either a

group or a

group may be replaced with an alkyl group.

4. The azo dye compounds having the general formula:

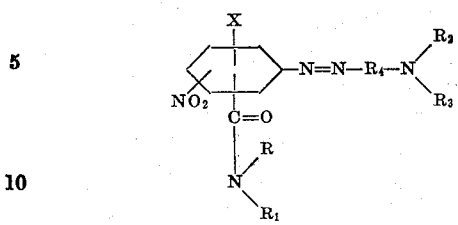

wherein R and R₁ each represents a member selected from the group consisting of hydrogen, an alkyl group, an allyl group, a phenyl nucleus and a cyclohexyl group, X represents a member selected from the group consisting of a nitro group, a halogen atom, an alkyl group, an alkoxy group, a

group and a

group, wherein R and R₁ have the meaning above given, R₄ represents an aryl nucleus of the benzene series containing but one benzene ring having a

group, wherein R₂ and R₃ each represents a member selected from the group consisting of hydrogen, an alkyl group and a benzyl radical, attached thereto in para position to the azo bond and

may be morpholine.

5. The azo dye compounds having the general formula:

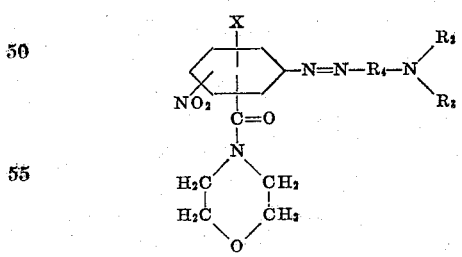

wherein X represents a member selected from the group, consisting of a halogen atom, a nitro group, an alkyl group, an alkoxy group, a

group, and a

group, wherein R and R₁ each represents a member selected from the group consisting of hydrogen, an alkyl group, an allyl group, a phenyl nucleus and a cyclohexyl group, R₄ represents an aryl nucleus of the benzene series containing but one benzene ring having a

group, wherein R₂ and R₃ each represents a member selected from the group consisting of hydrogen, an alkyl group and a benzyl radical, attached thereto in para position to the azo bond and

may be morpholine.

6. Material made of or containing an organic derivative of cellulose colored with a nuclear non-sulfonated azo dye compound having the general formula:

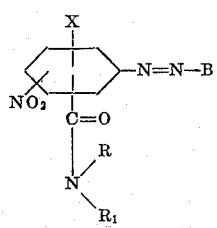

wherein B represents the residue of a member selected from the group consisting of an aryl nucleus of the benzene series containing but one benzene ring, an aryl nucleus of the naphthalene series, a heterocyclic nucleus, a 1,3-cyclohexadione nucleus, said benzene, naphthalene, heterocyclic and cyclohexadione nuclei being joined to the azo bond through their nuclei, and an aryl keto-acidylamino residue joined to the azo bond through the ketoacidylamino group, R and R₁ each represents a member selected from the group consisting of hydrogen, an alkyl group, an allyl group, a phenyl nucleus and a cyclohexyl group, X represents a member selected from the group consisting of a nitro group, a halogen atom, an alkyl group, an alkoxy group, a

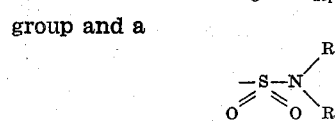

group and a

group, wherein R and R₁ have the meaning above given, and

may be morpholine.

7. A cellulose acetate colored with a nuclear non-sulfonated azo dye compound having the general formula:

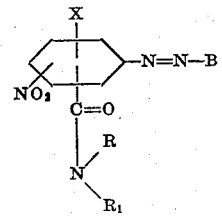

wherein B represents the residue of a member selected from the group consisting of an aryl nucleus of the benzene series containing but one benzene ring, an aryl nucleus of the naphthalene series, a heterocyclic nucleus, a 1,3-cyclohexadione nucleus, said benzene, naphthalene, heterocyclic and cyclohexadione nuclei being joined to the azo bond through their nuclei, and an aryl ketoacidylamino residue joined to the azo bond through the ketoacidylamino group, R and R₁ each represents a member selected from the group consisting of hydrogen, an alkyl group, an allyl group, a phenyl nucleus and a cyclohexyl group, X represents a member selected from the group consisting of a nitro group, a halogen atom, an alkyl group, an alkoxy group, a

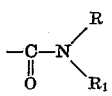

group and a

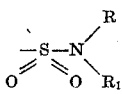

group, wherein R and R₁ have the meaning above given, and

may be morpholine.

8. A cellulose acetate colored with a nuclear non-sulfonated azo dye compound having the general formula:

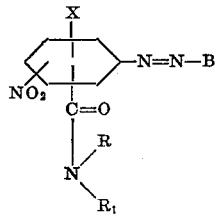

wherein B represents the residue of an aryl coupling component of the benzene series containing but one benzene nucleus, R and R₁ each represents a member selected from the group consisting of hydrogen, an alkyl group, an allyl group, a phenyl nucleus and a cyclohexyl group, X represents a member selected from the group consisting of a nitro group, a halogen atom, an alkyl group, an alkoxy group, a

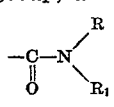

group and a

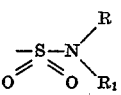

group, wherein R and R₁ have the meaning above given, and

may be morpholine.

9. A cellulose acetate colored with a nuclear non-sulfonated azo dye compound having the general formula:

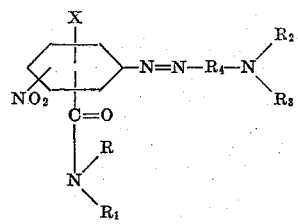

wherein R and R₁ each represents a member selected from the group consisting of hydrogen, an alkyl group, an allyl group, a phenyl nucleus and a cyclohexyl group, X represents a member selected from the group consisting of a nitro group, a halogen atom, an alkyl group, an alkoxy group, a

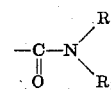

group and a

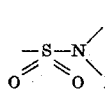

group, wherein R and R₁ have the meaning above given, R₄ represents an aryl nucleus of the benzene series containing but one benzene ring having a

group, wherein R₂ and R₃ each represents a member selected from the group consisting of hydrogen, an alkyl group and a benzyl radical, attached thereto in para position to the azo bond and may be morpholine.

JAMES G. McNALLY.
JOSEPH B. DICKEY.